United States Patent [19]

Ohlson

[11] 4,377,351
[45] Mar. 22, 1983

[54] HOLDING DEVICE

[76] Inventor: Kurt L. Ohlson, Vändelsö Skolväg 104, 136 69 Handen, Sweden

[21] Appl. No.: 197,070

[22] Filed: Oct. 15, 1980

[51] Int. Cl.³ .............................................. F16B 1/00
[52] U.S. Cl. ..................................... 403/348; 403/287
[58] Field of Search ........................ 403/287, 348, 349

[56] References Cited

U.S. PATENT DOCUMENTS

| 2,617,166 | 11/1952 | Kaufmann | 403/349 X |
| 3,749,432 | 7/1973 | Janssen | 403/348 X |
| 4,143,984 | 3/1979 | Danescu | 403/348 X |

FOREIGN PATENT DOCUMENTS 281187 12/1914 Fed. Rep. of Germany ...... 403/348

Primary Examiner—Andrew V. Kundrat
Attorney, Agent, or Firm—Burns, Doane, Swecker & Mathis

[57] ABSTRACT

A holding arrangement intended to hold a plate-like element to a post. The holding arrangement is provided with a peg having different cross-sections formed at two perpendicular coordinates. In a first position of rotation of the arrangement relative to the first element, the peg can be inserted into the element, and upon further rotation of the arrangement to a second position of rotation, a larger cross-section of the peg clamps the holding arrangement firmly against surfaces formed in the first element.

1 Claim, 17 Drawing Figures

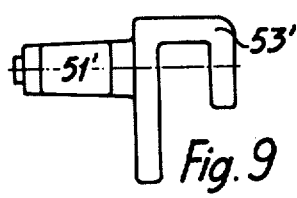
Fig. 9
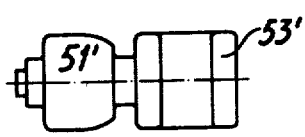
Fig. 10
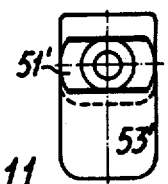
Fig. 11
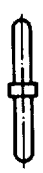
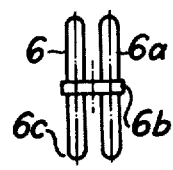
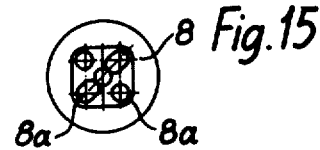
Fig. 15
Fig. 12   Fig. 13   Fig. 14
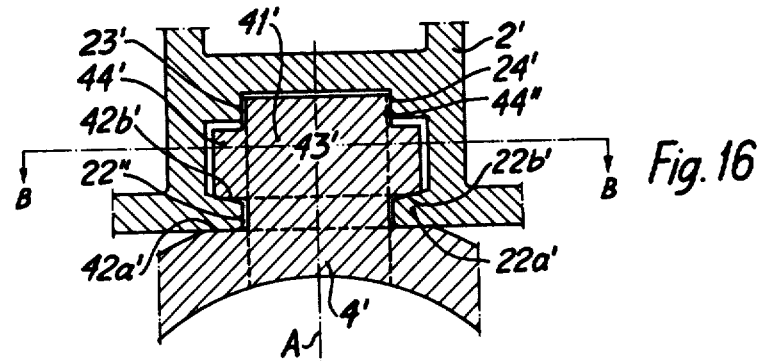
Fig. 16
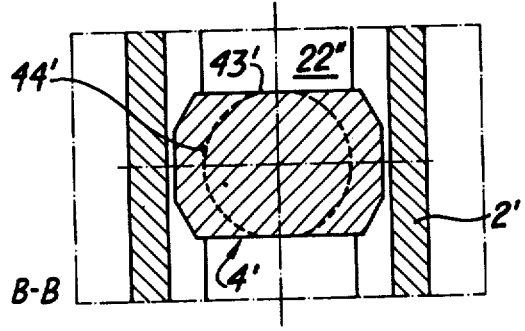
Fig. 17

HOLDING DEVICE

TECHNICAL FIELD

The present invention relates to a holding device, and particularly to a holding device which is intended to hold a first element, for example a plate or like element, to a second element, for example in the form of a post, a rail or the like. To this end, the holding means is provided with first means for co-action with the first element and is provided with second means for co-action with the second element.

BACKGROUND ART

Various holding devices of the aforementioned kind are previously known to the art, in which said holding device is so constructed as to be fastened to a rail by rotating the device through an angle of 90°.

Other kinds of holding devices which are particularly constructed to co-act with, for example, a rail of particular design are also known to the art.

SUMMARY OF THE INVENTION

PROBLEMS

Previously known holding devices of the kind envisaged are encumbered with serious problems, particularly when the holding device is constructed so as to be effective when rotated, and when rotated expands and presses against a rail, for example, since it has been found that the resultant expansion force is of such magnitude that the rail, especially if it is made of aluminium, yields to the internal pressure.

Consequently, a desire within the art is to construct such a holding device and such a rail in a manner so that there is obtained a fixed connection with each other, without distorting the rail.

It has also been found problematic to produce a holding device of simple construction, and above all to produce such a device from plastic elements which can be manufactured by moulding techniques.

SOLUTION

An object of the present invention is to provide a solution to the aforementioned problems, to which end it is proposed that the first means comprises a peg having differing cross sections formed in two perpendicular coordinates. In a first rotary position of said device relative said first element, the peg can be moved into said element and upon rotation of said device to a second position of rotation, the larger cross section of said peg will clamp the device against said first element. This clamping is effected by providing said first element with a recess so shaped that the inner cavity is greater than its slot. By providing the inner wall part of said recess with parallel wall surfaces, it is possible for the larger cross section of said peg to be clamped firmly against the parallel wall surfaces, and since said parallel wall surfaces are located centrally of and adjacent an intermediate wall of said rail the aforementioned disadvantages are eliminated.

In one plane the peg has a thickness which corresponds to the width of the slots, and in a perpendicular plane a configuration which corresponds to said recess.

By arranging in the inner wall part a plurality of apertures, which serve as positioning means for said device, it is possible, in a simple manner, to position the device along said edge part in an exactly defined manner, which is an important advantage.

ADVANTAGES

The most important advantages afforded by a holding means in accordance with the present invention is the simplicity of manufacture and construction of said means, together with the possibility afforded by the fact that the holding means can be brought into co-action with a rail with the aid of a tensioning force without the rail expanding and without any change in the cross-sectional shape of said rail due to said expansion force.

BRIEF DESCRIPTION OF THE DRAWINGS

A preferred embodiment of the present invention illustrating the important characteristic features thereof will now be described with reference to the accompanying drawing in which, FIG. 9 is a first side view of an alternative holding means arranged to co-act with a post or rail, FIG. 10 is a second side view of a holding means according to FIG. 9, FIG. 11 is a front view of the holding means shown in FIG. 9, FIG. 12 is two projection views of a first connecting element for said corner details, FIG. 13 is two projection views of a second connecting element for said corner details, FIG. 14 is two projection views of a third connecting element, for said corner details, FIG. 15 is two projection views of a foot part arranged to accommodate one or more connecting elements, and FIGS. 16 and 17 are views of an alternative holding means.

DETAILED DESCRIPTION OF A PREFERRED EMBODIMENT

Figure 1:
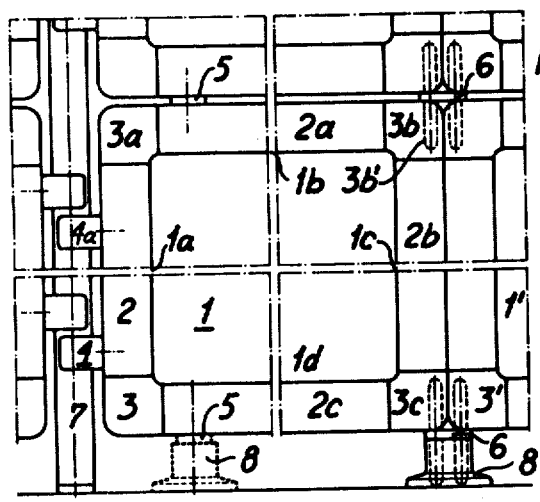
FIG. 1 is a plan view of a plate-like element fastened to a post, and also fastened to a plurality of adjacent plate-like elements.

In FIG. 1 there is illustrated in plan view a plate-like element which is connected to a post and also connected to a plurality of mutually adjacent plate-like elements.

The plate-like element comprises a plate 1 and respective edge portions of said plate are provided with an edge strip and two corner elements or details. Thus, the edge part 1a of said plate is provided with or co-acts with an edge strip 2 and two corner elements 3 and 3a. The edge part 1b co-acts with an edge strip 2a and two corner elements 3a and 3b. Similarly, the edge part 1c co-acts with an edge strip 2b and the corner elements 3b and 3c, while the edge part 1d co-acts with an edge strip 2c and corner elements 3c and 3.

The edge parts 2, 2a, 2b and 2c are identical and are formed from one and the same profiled element, preferably an aluminium profiled element. In the FIG. 1 embodiment, the edge strip 2 co-acts with two holding means 4, 4a, the design of which will be described hereinafter with reference to FIGS. 3 and 4. The edge strip 2a is arranged to co-act with a holding means 5 arranged to guide two plate-like elements arranged side-by-side and over each other. A similar holding means 5 is arranged to co-act with the edge strip 2c, but is here intended to receive a base or foot part 8.

The corner elements 3, 3a, 3b and 3c are identical, and will be described in more detail hereinafter with reference to FIG. 8.

It should be noted that each corner element is provided with a hole. With reference to FIG. 1, co-operating with the corner element 3b and the hole or orifice 3b' arranged therein is a connecting element 6, the construction of which will be described in more detail with reference to FIG. 13.

As will be seen from FIG. 1, the left edge portion 1a of the plate 1 also co-acts, via the holding means 4, with a post 7 of circular cross sectional shape, while the edge strip 2a co-acts, via the holding means 5, with a plate-like unit of similar construction, and that the edge strip 2b co-acts in tight relationship with a laterally arranged further plate-like unit. The corner element 3c of the plate 1 is positioned immediately adjacent the corner element 3' of the plate 1', and a connecting element 6 holds together the said two corner elements. The connecting element 6 is arranged also to co-act with a foot part 8, which will be more fully described hereinafter with reference to FIG. 15.

Figure 2:
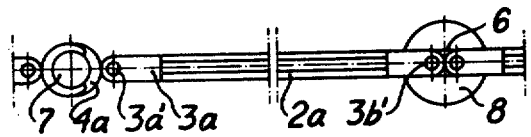
FIG. 2 is a horizontal view of the array shown in FIG. 1.

FIG. 2 illustrates the array shown in FIG. 1 in a horizontal view and in section taken immediately above the plate-like element 1 with the holding means 5 removed.

Since the holding means 4 and 4a are identical, only the holding means 4 will be described.

The edge strip comprises a metal profile having a first recess 21 for receiving the edge part 1a of the plate 1.

The edge strip also exhibits a second recess 22 intended to accommodate the holding means 4. However, said second recess 22 is not only intended to receive and hold the holding means 4, but also to hold the connecting element 5 and other like elements.

The holding means 4 is also arranged to secure a first element, for example in the form of a plate 1 or the like, to a second element, for example in the form of a post 7. As will be understood, the post 7 can be replaced by a rail or like element.

As previously mentioned, the holding means 4 is intended to hold a first element, for example having the form of a plate 1 or like element, to a second element, for example having the form of a post 7. The post can, of course, be replaced by a rail or like element.

The holding means 4 is provided with first means 41 for co-action with the first element, i.e. the plate-like unit 1, via the strip 2, and is also provided with second means 42 for co-action with the second element or post 7. The first element or means 41 comprises a peg having mutually different cross sections formed by two perpendicular coordinates. The one cross-section has been referenced 43 in FIG. 3, while the other cross-section oriented perpendicularly to said first cross-section has been referenced 44 in FIG. 4. It will be seen from these two projections that when the holding means 4 is rotated to a first position, namely the position shown in FIG. 3, and when said position of rotation is related to the plate 1 or to said first element, said peg 41 can be moved into the second recess 22 of the edge strip 2. When the means 4 is rotated to a second position of rotation, namely the position shown in FIG. 4, the second, larger cross-section 44 of said peg will clamp the means 4 firmly against the first element 2. This is effected by the fact that the second recess 22 of the edge strip 2 is provided with two internal surfaces 23 and 24 dimensioned to absorb the forces created by the means 41.

The edge strip 2 is provided with the recess 22 exhibiting an inner cavity greater than its slot 22'. Located in the inner wall part 25 of the recess 22 are parallel force-absorbing wall surfaces 23 and 24, against which the larger cross-section 44 of the peg 41 is tensioned.

Figure 3:
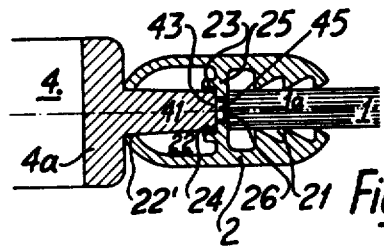
FIG. 3 is a view of a holding device located between said plate-like element and said post in a first position of rotation.
Figure 4:
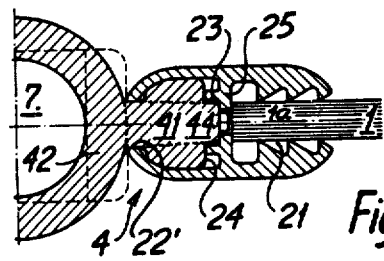
FIG. 4 is a view of the said holding device between said plate-like element and said post in a second position of rotation.

It will be seen from FIG. 3 that in one plane the peg 41 has a thickness which corresponds to the width of the slot 22', while in another plane (taken perpendicularly to the plane in FIG. 3, and which is illustrated in FIG. 4) the peg 41 is provided with a configuration corresponding to that of the recess or the cavity 22.

The central or inner wall part 25 of the edge strip is provided with a plurality of mutually spaced holes 26. These holes serve as positioning means for the holding means 4.

By ensuring that a part 45 of the peg 41 must be inserted in the hole 26 in order to ensure a holding action of the means 4, it is possible to obtain an exact orientation of the position of said holding means 4 along the edge strip 2. By allowing the distance from one corner element 3 to the nearest fixing means 4 to be different from the distance from the next corner element 3a to its nearest positioning or fixing means 4a, the plate 1 can advantageously take different positions and be rotated without the holding or fixing means of one plate being located opposite the holding means of an adjacent plate. In addition, by allowing the distance to be mutually different between adjacent plates, there is afforded the further possibility of mounting the plate 1 in an arbitrary position relative to a post.

Figure 5:
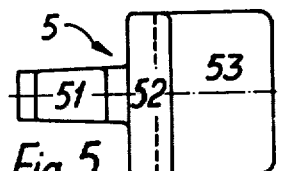
FIG. 5 is a first side view of a holding device intended to hold together two mutually adjacent sides of two adjacent plates.

FIG. 5 illustrates a first side view of a holding means 5 intended to hold together the sides of laterally oriented plates. The holding means 5 also exhibits a peg 51 identical with the previously described peg 41, and it will be understood that the peg 51 is able to co-act with the recess 22 in the edge strip 2. Mounted to the peg 51 is a spacer 52 and a holder means 53 arranged to co-operate with an adjacent plate. The holder means 53 is intended to be inserted into the cavity 22 of an edge strip intended for an adjacently located plate.

Figure 6:
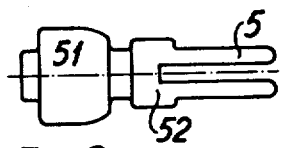
FIG. 6 is another side view of a holding means according to FIG. 5.
Figure 7:
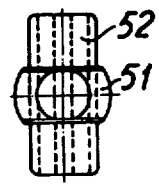
FIG. 7 is a view of the holding means shown in FIG. 5 in front-view.

FIG. 6 illustrates a second side view of the holding means shown in FIG. 5, while in FIG. 7 the holding means of FIG. 5 is shown in front view.

Figure 8:
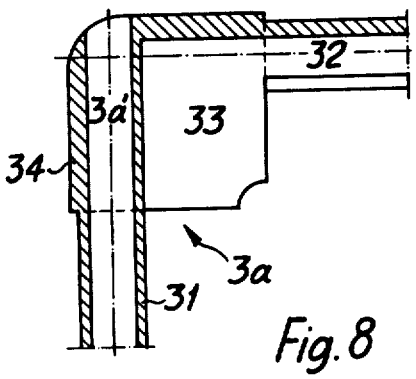
FIG. 8 is a sectional side view of a corner detail for said plate.

FIG. 8 illustrates in side view and partially in section a corner element intended for the plate 1. It should be noted that all corner elements 3, 3a, 3b and 3c are identical, and hence only the corner element 3a will be described, with reference to FIG. 8.

As previously mentioned, the edge strips 2 and 2a comprise metal profiles and are provided with a recess 21 for receiving an edge surface 1a of said plate, and a second recess 22 for receiving the holding means 4 and 5. The corner element 3a is provided with a peg 41 arranged to co-act with the second recess 22 in the edge strip 2. The second recess 22 is separated from the first recess 21 for accommodating the plate by a partition 25. Similarly, the corner element 3a is provided with a peg 32 arranged to co-act with an edge part 2a associated with the second recess 22.

It will also be seen from FIG. 8 that the corner element 3a is provided with a hole 3a', which is arranged to co-act with different connecting elements. FIG. 8 also illustrates that the corner element is provided with mutually spaced apart wall parts 33 (only one of which is shown), where one wall part 33 is intended to abut one edge surface of the plate 1, while the other wall part is intended to abut the opposite surface of said plate. In this way, there is obtained good clamping and anchoring of the corner part of the plate 1.

FIG. 9 illustrates a first side view of an alternative embodiment of a holding means, intended to hold or clamp a plate-like element and to co-act with a post, a rail or like structural element in the manner previously described. To this end, the holding means exhibits a peg 51' which is identical with the peg of the FIGS. 5-7 embodiments. The peg 51' has a hook 53' which is particularly intended to enclose a rail, the end of a pipe or like element. FIGS. 10 and 11 are two further projectional views of this holding means.

FIG. 12 illustrates in two projectional views a first connecting element for the corner elements, while FIG. 13 illustrates in two projectional views a further connecting element 6 for the corner elements. FIG. 14 illustrates, in two projectional views, a third connecting element for the corner elements. These connecting elements (according to FIG. 13) comprise two upper pegs 6a, a plate 6b and two lower pegs 6c. FIG. 1 illustrates the connecting element shown in FIG. 13 in one mode of application. It should be noticed here that the connecting elements shown in FIGS. 12-14 could well be designed in a manner such as to lack the lower pegs 6c, whereat further connecting elements are obtained.

Finally, FIG. 15 illustrates in two projectional views a foot-part 8 having holes 8a intended to receive one or more connecting elements of the kind shown in FIGS. 12-14, and also intended to co-act with a corner element.

With respect to connecting elements shown in FIGS. 13 and 14 it should be observed that when corner elements such as those shown in FIG. 8 co-act with pegs 6a, or pegs 6c of the elements, the corner elements may be guided relative to one another by providing the surface 34 with teeth arranged to co-act with corresponding teeth in one surface of an adjacent element.

Rotation of one element relative to said peg will cause a corresponding rotation of all elements.

FIGS. 16 and 17 illustrate an alternative embodiment of a holding means according to the invention, in which the clamping forces act partly perpendicularly and partly parallel to the axis of rotation "A". Also in this embodiment of the invention the holding means is intended to hold a first element, for example in the form of a plate or like element, to a second element, for example in the form of a post 7, a rail or like element. The holding means is provided with a first member for co-action with the first element and also provided with a second member for co-action with the second element, in which the first member comprises a peg 41' having different cross sections 43', 44' formed by two perpendicular coordinates. In this way, in a first position of rotation of the means 4' relative to the first element 2', the peg can be moved into the element 2', and upon rotation of the means to a second position of rotation, the peg will clamp firmly the means 4' against the first element 2'. The clamping force required in order to hold the elements together is directed parallel to or substantially parallel to the axis of rotation A.

A first surface 42a' formed perpendicular to the axis of rotation, and a second surface 42b' formed at a second angle perpendicular to the first surface 42a', of the means 4', is arranged in the second position of rotation, illustrated in FIGS. 16 and 17, to exert mutually oppositely directed clamping forces on respective sides of a projection 22a' formed on the element 2'.

The projection 22a' has an oblique surface 22b', while the means 4' is provided with a straight surface 42b' extending at right angles to the axis of rotation A, or vice versa, whereby there is obtained a "snap action" when the means 4' adopts its second position of rotation.

In the inner wall part of the recess, remote from the slot 22", there are found wall surfaces 23' and 24' which lie parallel relative to the axis of rotation A and against which the large cross-section 44" of the peg 44' is urged with a force directed at right angles to the axis of rotation A.

As will be understood, the invention is not limited to the aforedescribed exemplary embodiments, but can be modified within the scope of the following claims.

In order to comprise the maximum concentrated force parallel to the axis of rotation, the angular value of the surface 22b' should be less than 45°, and preferably below 25°. Preferably said angle is from 5° to 15°.

I claim:

1. A holding arrangement intended to hold a first element to a second element, comprising a first member for co-action with said first element, a second member for co-action with said second element, said first member including a peg having different cross sections formed in two perpendicular planes such that when said holding arrangement is rotated about an axis to a first position of rotation relative to said first element the peg is able to enter a slot of a recess in said first element and when said holding arrangement is rotated to a second position of rotation said peg clamps said holding arrangement to said first element, two mutually perpendicular surfaces producing a clamping force required to hold said first element and said holding arrangement together and extending perpendicular to the axis of rotation such that the clamping force is directed substantially parallel to said axis of rotation, a rear portion of said recess remote from said slot having wall surfaces which are parallel to said axis of rotation, a large cross-section of said peg clamping against said wall surfaces with a force acting perpendicular to the axis of rotation.

* * * * *